United States Patent
Vlaming Hummel et al.

(10) Patent No.: US 12,536,232 B1
(45) Date of Patent: Jan. 27, 2026

(54) DYNAMIC PROJECTION FOR TIME SERIES DATA

(71) Applicant: ServiceNow, Inc., Santa Clara, CA (US)

(72) Inventors: Luc Vlaming Hummel, Münsing (DE); Nitin Gurram, Hyderabad (IN); Jasper Smit, Groningen (NL)

(73) Assignee: ServiceNow, Inc., Santa Clara, CA (US)

( * ) Notice: Subject to any disclaimer, the term of this patent is extended or adjusted under 35 U.S.C. 154(b) by 0 days.

(21) Appl. No.: 19/042,327

(22) Filed: Jan. 31, 2025

(51) Int. Cl.
*G06F 16/9035* (2019.01)
*G06F 16/907* (2019.01)

(52) U.S. Cl.
CPC ........ *G06F 16/9035* (2019.01); *G06F 16/907* (2019.01)

(58) Field of Classification Search
CPC .......................... G06F 16/9035; G06F 16/907
USPC .......................................................... 707/722
See application file for complete search history.

(56) References Cited

U.S. PATENT DOCUMENTS

| | | | | |
|---|---|---|---|---|
| 11,132,743 | B2* | 9/2021 | Parker | G06Q 40/00 |
| 11,442,924 | B2* | 9/2022 | Miller | G06F 40/177 |
| 12,056,120 | B2* | 8/2024 | Luo | G06F 16/245 |
| 12,131,233 | B1* | 10/2024 | Kulkarni | G06F 16/245 |
| 2003/0169284 | A1* | 9/2003 | Dettinger | G06F 16/2428 715/708 |
| 2007/0025351 | A1* | 2/2007 | Cohen | G06F 9/542 370/390 |
| 2011/0264637 | A1 | 10/2011 | Peled et al. | |
| 2015/0363464 | A1 | 12/2015 | Alves et al. | |
| 2016/0224676 | A1* | 8/2016 | Miller | G06Q 10/00 |
| 2021/0342125 | A1 | 11/2021 | Burnett et al. | |
| 2024/0303236 | A1* | 9/2024 | Andreev | G06F 16/2458 |
| 2025/0225135 | A1 | 7/2025 | Bhattacharjee et al. | |

OTHER PUBLICATIONS

Namiot, Dmitry, "Time Series Databases", DAMDID/RCDL 2015, Obninsk, Russia, Oct. 13-16, 2015, pp. 132-137.*
Kang, Rui, et al., "Optimizing Time Series Queries with Versions", Proc. of the ACM on Management of Data, vol. 2, Issue 3, Article No. 159, Jun. 2024, pp. 1-27.*
Bitincka, Ledion, et al., "Optimizing Data Analysis with a Semi-structured Time Series Database", SLAML '10, Vancouver, British Columbia, Canada, Oct. 3, 2010, pp. 1-9.*

* cited by examiner

*Primary Examiner* — Robert Stevens
(74) *Attorney, Agent, or Firm* — Novak Druce Carroll LLP

(57) ABSTRACT

Aspects of the subject technology relate to systems, methods, and computer-readable media for dynamically filtering time series data using multiple conditions in a structured query environment. An example method can include receiving, in a structured query environment, a data request, which includes a plurality of conditions associated with a time period. The example method further includes accessing a database, which is configured to store time-series data corresponding to the time period and mapping a set of dates based on the plurality of conditions associated with the time period. The example method also includes applying a sequence of filters corresponding to the plurality of conditions, onto the set of dates, within a single query to the database and obtaining, from the database, data corresponding to filtered dates.

20 Claims, 6 Drawing Sheets

DYNAMIC PROJECTION FOR TIME SERIES DATA

BACKGROUND

1. Technical Field

The present disclosure generally relates to data analysis, and more specifically to dynamically filtering time series data using multiple conditions in a structured query environment.

2. Introduction

Entities such as business enterprises and other organizations often analyze, monitor, and report key metrics (e.g., key performance indicators (KPIs)) to understand performance metrics over time and improve business performance. For example, a performance analytics team can track and capture changes to data in a database to generate analytics for trend analysis and/or time-series aggregations. Many key metrics are inherently time-based and measured daily, weekly, monthly, etc. Such time-series data captures observations at sequential points in time and provides insights for identifying trends, seasonality, and patterns.

BRIEF DESCRIPTION OF THE DRAWINGS

The various advantages and features of the present technology will become apparent by reference to specific implementations illustrated in the appended drawings. A person of ordinary skill in the art will understand that these drawings only show some examples of the present technology and would not limit the scope of the present technology to these examples. Furthermore, the skilled artisan will appreciate the principles of the present technology as described and explained with additional specificity and detail through the use of the accompanying drawings in which.

DETAILED DESCRIPTION

Figure 1A:
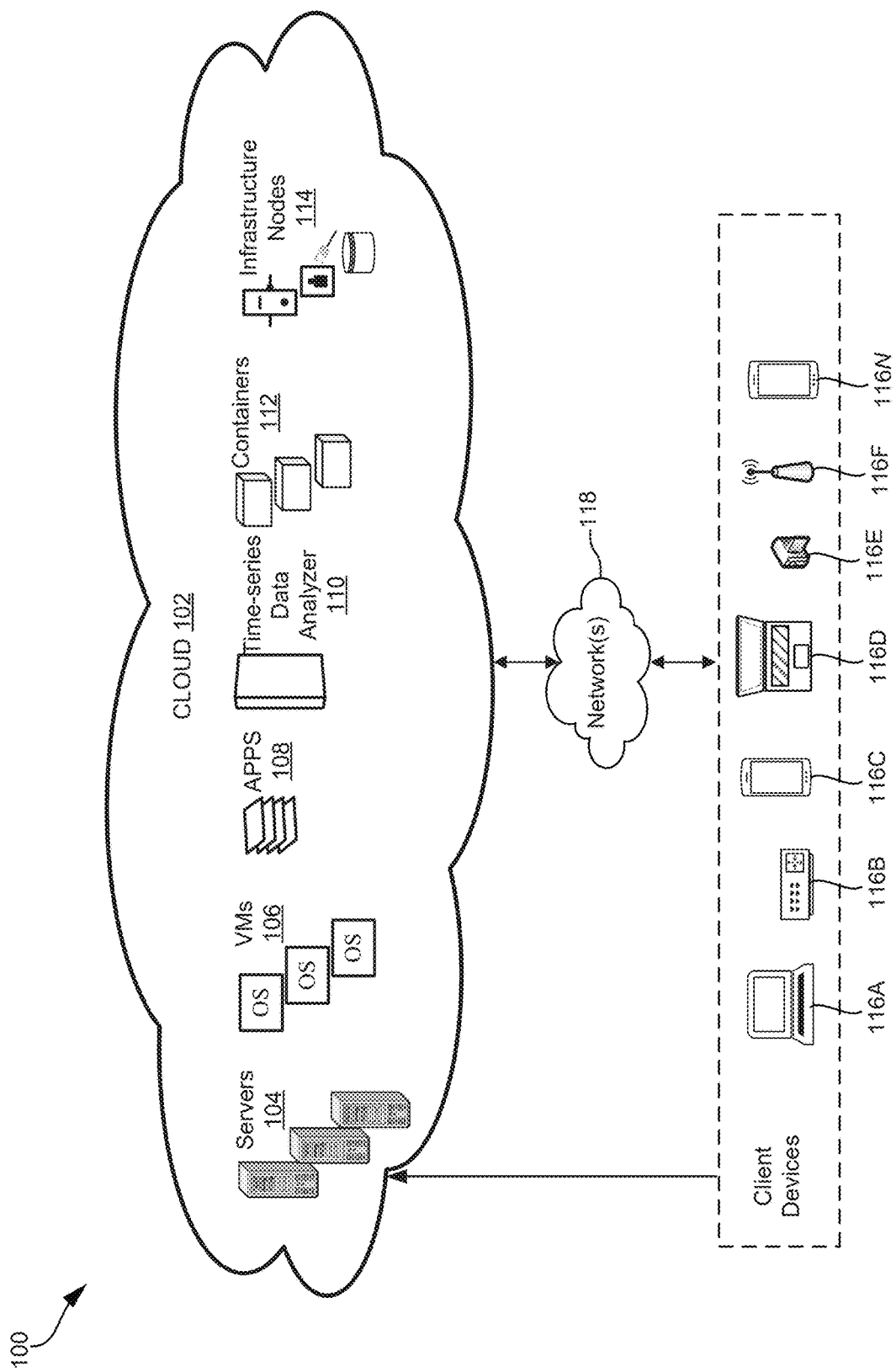
FIG. 1A illustrates a diagram of an example cloud computing architecture, according to some examples of the present disclosure.

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a more thorough understanding of the subject technology. However, it will be clear and apparent that the subject technology is not limited to the specific details set forth herein and may be practiced without these details. In some instances, structures and components are shown in block diagram form to avoid obscuring the concepts of the subject technology.

As previously mentioned, entities such as business enterprises and other organizations often analyze, monitor, and report key metrics (e.g., key performance indicators (KPIs)) to understand performance metrics over time and improve business performance. For example, a performance analytics team can track and capture changes to data in a database to generate analytics for trend analysis and/or time-series aggregations. Many key metrics are inherently time-based and measured daily, weekly, monthly, etc. Such time-series data captures observations at sequential points in time and provides insights for identifying trends, seasonality, and patterns.

A customized time period or date range (e.g., weeks, months, quarters, sprints, etc.) is often used to analyze and understand patterns, trends, correlations, and/or anomalies within the user-defined date range. For example, users may want to exclude specific days (e.g., Saturday, Sunday, holidays, etc.) from business days or define a custom schedule according to their needs. Also, users may want to run analytical queries based on relative dates instead of fixed dates or standard dates.

However, applying relative date conditions or customized date ranges to time-series data can be challenging because the relative dates may not align with the standard calendar. Further, it can be time-consuming and resource-intensive when the data volume is high and all possible groupings of dates need to be generated to filter customized date ranges. In a structured query environment (e.g., a Structured Query Language (SQL) environment), databases include Change Data Capture (CDC) format data. As follows, each row has a start date and an end date and a calendar projection is applied on top. This way, a row per day in the CDC range needs to be generated, and then filtered using multiple JOINs (e.g., joining the calendar mapping in), resulting in exploding the rows into a row-per-day format and therefore, instability and resource usage inefficiency. For example, projecting 100 million data rows to query in a SQL database would take longer than 10 minutes due to the complexity of projecting all possible columns.

The disclosed technology addresses the foregoing by filtering time-series data using a combination of user-specified date ranges and projection conditions. The disclosed technology can filter using a set, directly operate on the set, and output a set again, thereby avoiding the expensive row-expanding and hashing. For example, the disclosed technology can project and filter each day in a date range using a sequence of projection operators, enhancing query efficiency for relative dates. As follows, the ability to apply multiple projections to a time series dataset in a single query can improve efficiency when dealing with complex filtering conditions over non-continuous time ranges.

Further, the disclosed technology can dynamically map input dates to target dates, and therefore, filters can be applied, enabling more flexible date-based queries. For example, every row can be filtered through multiple projections and projected only if all the conditions (e.g., user-defined date range, conditions defined in a user query) are satisfied. As follows, the disclosed technology can utilize multiple projections and/or filters to be passed once and the data can be projected efficiently. For example, instead of projecting all possible 100 M data rows, which would take more than 10 minutes, the disclosed technology can query in a SQL database in less than 30 seconds by dynamically projecting only if all conditions are met.

FIG. 1A illustrates a diagram of an example cloud computing environment 100 that can be used to implement a data analysis system, according to some examples of the present disclosure. The cloud computing environment 100 can include and/or represent a cloud 102. The cloud 102 can include one or more private clouds, public clouds, and/or hybrid clouds. Moreover, the cloud 102 can include cloud elements 104-114. The cloud elements 104-114 can include or represent, for example, servers 104, virtual machines (VMs) 106, applications or services 108, time-series data analyzer 110, software containers 112, and/or infrastructure nodes 114. The infrastructure nodes 114 can include various types of nodes, such as compute nodes, storage nodes, network nodes, management systems, etc.

The cloud 102 can provide cloud computing services via the cloud elements 104-114, such as software as a service (SaaS) (e.g., collaboration services, email services, enterprise resource planning services, content services, communication services, etc.), infrastructure as a service (IaaS) (e.g., security services, networking services, systems management services, etc.), platform as a service (PaaS) (e.g., web services, streaming services, application development services, etc.), and other types of services such as desktop as a service (DaaS), information technology management as a service (ITaaS), managed software as a service (MSaaS), mobile backend as a service (MBaaS), etc.

The client devices 116A-N (collectively referred to as "client devices 116" hereinafter) can connect with the cloud 102 to obtain one or more specific services from the cloud 102. The client devices 116 can connect with the cloud 102 from any network of the client devices 116 such as a local area network (wired and/or wireless), a cellular network, and/or any other network, and using the network(s) 118 to transport communications between the cloud 102 and the client devices 116. For example, the client devices 116 can communicate with the cloud 102 and/or any of the elements 104-114 via a network(s) 118. The network(s) 118 can include one or more public networks (e.g., the Internet, a wide area network, etc.), one or more private networks (e.g., local area network(s), wireless local area network(s), private backbone network(s), etc.), and/or one or more hybrid networks (e.g., virtual private network(s), public and private cloud network(s), etc.).

The client devices 116 can include any device with networking capabilities, such as a laptop computer, a tablet computer, a server, a desktop computer, a smartphone, a network device (e.g., an access point, a router, a switch, etc.), a smart television, a smart car, a sensor system, a gaming console, a smart wearable device (e.g., smartwatch, etc.), an internet of things (IoT) device, a camera, a network printer, or any other computing device.

Figure 1B:
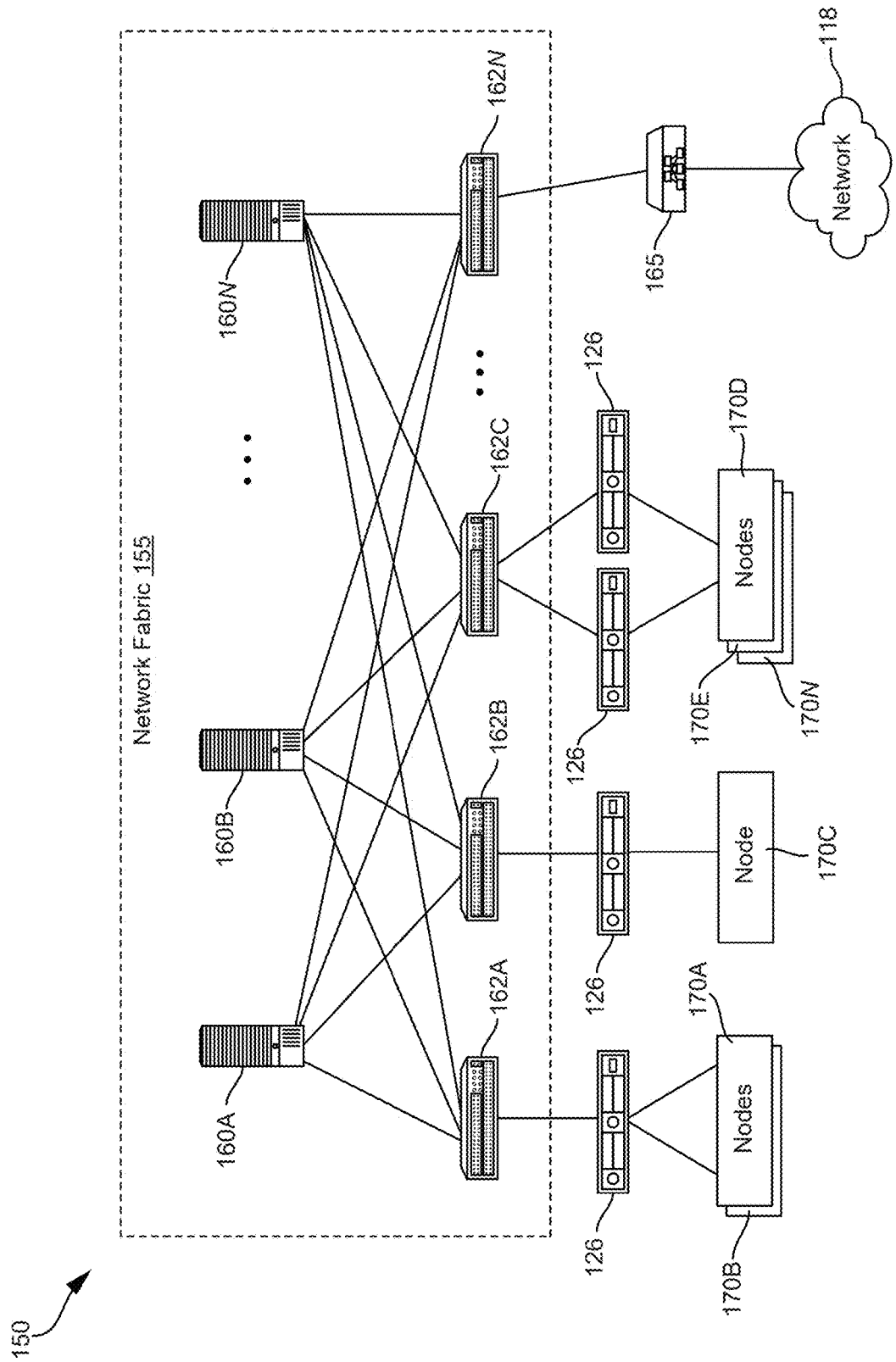
FIG. 1B is a block diagram illustrating an example network architecture that can be used to implement one or more aspects, components, devices, nodes, systems, instances, and/or portions of the example cloud computing architecture, according to some examples of the present disclosure.

In some examples, the cloud 102 can implement a data analysis system and time-series data analyzer 110 associated with one or more entities. The client devices 116 can access the data analysis system or time-series data analyzer 110 implemented and/or hosted in the cloud 102 to dynamically filtering time series data using multiple conditions in a structured query environment, as further described herein. An example network architecture that can be used to implement a network or datacenter (or any portion thereof), such as the cloud 102, is shown in FIG. 1B and further described below. In some cases, one or more services, components, devices, nodes, systems, instances, and/or portions of the example network architecture 150 shown in FIG. 1B can be implemented by and/or in a cloud network or datacenter, such as the cloud 102.

FIG. 1B is a block diagram illustrating an example network architecture 150 that can be used to implement one or more portions of the example cloud computing environment 100, according to some examples of the present disclosure. The example network architecture 150 in FIG. 1B can represent, implement, deploy, host, support, include and/or provide the infrastructure for (or a portion of the infrastructure for) a datacenter (e.g., a cloud datacenter, an on-premises datacenter, a hybrid datacenter including private and public datacenters or datacenter portions, etc.), a network infrastructure, and/or any network environment (or portion thereof) such as, for example and without limitation, a cloud network/environment, a campus network/environment, an enterprise network/environment, an on-premises network/environment, a private network/environment, a public network/environment, a hybrid network/environment (e.g., a network/environment including both private and public networks/environments or portions thereof), and/or the like.

In some examples, the example network architecture 150 can host, implement, deploy, provide (e.g., provide the infrastructure for or a portion of the infrastructure for), support, and/or run/execute one or more applications, virtual machines (VMs), software containers, software tools, software functions, software algorithms, software models (e.g., artificial intelligence and machine learning models, software models implementing one or more classical algorithms, etc.), software applications, software packages, domains, databases, networks, services, workloads, service chains, functions, controllers, virtual network functions (VNFs), servers, drivers, hardware and/or software resources, software and/or hardware devices, software and/or hardware nodes, networking elements, serverless environments, serverless functions, cloud services and/or applications (e.g., software-as-a-service, function-as-a-service, infrastructure-as-a-service, platform-as-a-service, cloud applications, and/or any other cloud services and/or applications), execution environments, storage systems, processing/compute systems, memory systems, software and/or network sites, software policies, virtual/logical networks, overlay networks, software-defined networks (SDNs), interfaces, and/or any other code, component, element, application, service, etc.

For example, the network architecture 150 can include, represent, implement, support, run, host, and/or provide the infrastructure for (or a portion of the infrastructure for) a datacenter, network (e.g., a cloud or cloud network, an on-premises network, a private network, a public network, a hybrid network, etc.), network infrastructure, and/or network environment used to host, implement, support, deploy, provide, and/or run workloads/nodes. In some cases, a cloud node can implement, include, represent, support, run, host, and/or provide one or more software applications/services, software systems, software packages, software modules, software units, software tools, interfaces, software/application code, functions, virtual environments, virtual applications, execution environments, virtualization elements (e.g., operating system-level virtualization elements, application-level virtualization elements, etc.), platforms, and/or any other components. In some cases, the node can host and run one or more software containers, VMs, VNFs, applications (e.g., container applications, VM applications, and/or any other software applications), operating systems (OSs), functions, tools, and/or any other execution environment, code, tool, component, element, and/or package.

As shown in FIG. 1B, the network architecture 150 can include a network fabric 155. The network fabric 155 can include and/or represent the physical layer (e.g., underlay) and/or infrastructure of the network architecture 150. In some cases, the network fabric 155 can represent a data center(s) of one or more networks such as, for example, the cloud 102. The network fabric 155 can include network devices 160A-N (collectively referred to as "network devices 160" hereinafter) and network devices 162A-N (collectively referred to as "network devices 162" hereinafter), which are interconnected to route, relay, forward, and/or switch traffic in the network fabric 155. In some examples, the network devices 160 and the network devices 162 can include, implement, represent, and/or operate as switches (e.g., Layer 2 and/or Layer 3 switches, aggregation switches, ingress and/or egress switches, top-of-rack (ToR) switches, core switches, spine switches, leaf switches, etc.), routers, hubs, bridges, gateways, provider edge devices, firewalls, network controllers, and/or any other type of networking devices. In FIG. 1B, the network fabric 155 includes or implements a spine-leaf topology. In such examples, the network devices 160 can represent spine nodes (e.g., spine switches or routers) and the network devices 162 can represent leaf nodes (e.g., leaf switches or routers). In other examples, the network fabric 155 can alternatively or additionally include or implement any other network topology.

The network devices 160 are interconnected with the network devices 162, and the network devices 162 can connect the network 118, the system servers 126, the network device 165, and/or the nodes 170A-N (collectively referred to as "nodes 170" hereinafter) with any portion of the network fabric 155 (e.g., including each other). In some cases, the network fabric 155 can include, host, and/or implement a network overlay(s) or logical network(s) that includes or implements one or more application services, servers, VMs, software containers, virtual resources (e.g., storage, memory, processors, network interfaces, virtual tools, execution environments, etc.), workloads, functions, virtual networks, hardware and/or software resources, and/or any other element(s).

Network connectivity in the network fabric 155 can flow from the network devices 160 to the network devices 162, and vice versa. The network devices 162 can route, switch, relay, forward, and/or bridge network traffic to and from other portions of the network fabric 155, other networks, e.g., network 118, various network elements, the network device 165, the nodes 170, external client devices (e.g., clients devices external to the network fabric 155), data centers, clouds, tunnels, software-defined networks (SDNs) and/or SDN branches, on-premises networks, cloud tenants, cloud customers, applications, and/or any other network element. Thus, the network devices 162 can connect networks and network elements of the network fabric 155 with each other and with other networks and network elements.

In FIG. 1B, the system servers 126 can include or represent computer servers. Each of the system servers 126 can host, include, implement, and/or run one or more applications, functions, services, VMs, software containers, service chains, workloads, AI/ML models, algorithms, resources, cloud appliances, and/or any other software. For example, the system servers 126 can implement any of the applications 108 and/or time-series data analyzer 110 hosted on the cloud 102. In some cases, the system servers 126 connected to the network devices 162 can encapsulate and decapsulate packets to and from the network devices 162. For example, the system servers 126 can include, host, implement and/or operate one or more virtual routers, switches, gateways, endpoints, and/or network devices for tunneling packets between an overlay or logical layer hosted by, or connected to, the system servers 126 and an underlay layer represented by or included in the network fabric 155.

As shown in FIG. 1B, the system servers 126 can host, include, run, operate, and/or implement the nodes 170. In some examples, the nodes 170 can represent cloud instances. For example, in some cases, the nodes 170 can each represent a virtual server and/or environment (e.g., a VM, a software container, etc.) that uses compute, memory, storage, and/or networking resources on the cloud (e.g., network architecture 150) for respective workloads. For example, the nodes 170 can implement any of the applications 108 and/or time-series data analyzer 110 hosted on the cloud 102. In some implementations, the nodes 170 can perform parallel computing using, for example, multithreading. Each of the nodes 170 can include, host, implement, run, operate, and/or represent one or more server applications, software containers, VMs, software, services, AI/ML models, algorithms, cloud appliances, software functions, service chains, workloads, server-side functions, processing resources, computers, and/or any other software and/or hardware component.

For example, in some cases, each of the nodes 170 can represent a node instance that includes, implements, hosts, and/or runs a software container(s), an application(s), and/or a data analysis system(s). In some examples, a software container(s) associated with a node can provide, run, deploy, include, operate, represent, and/or implement an execution environment(s), a workload(s), an application(s), software, an AI/ML model(s), an algorithm(s), a driver(s), a computer service(s), a software model(s) and/or algorithm(s), a function(s), a software library/libraries, a software tool(s), a software/cloud appliance(s), a software component(s), and/or any other computing element(s). In some cases, the nodes 170 can represent cloud node instances running respective computing environments, such as software containers or VMs. Each VM can include software, services, drivers, applications, libraries, functions, virtualized resources (e.g., processors, memory, storage, network interfaces, etc.), and/or workloads installed, implemented, included, and/or running/executed on a guest operating system (OS) associated with the VM.

The network architecture 150 can deploy, run, implement, host, and/or support various resources (e.g., hosts, applications, services, functions, VMs, software containers, workloads, cloud appliances, service chains, hardware and/or software resources, AI/ML models, algorithms, application platforms, operating systems, etc.) using the system servers 126, the network fabric 155, the network devices 160, the network devices 162, the network device 165, the nodes 170, and/or the network 118.

In some cases, the network architecture 150 can implement and/or can be part of one or more cloud networks and can provide one or more cloud computing services such as, for example and without limitation, cloud storage, serverless computing, software-as-a-service (SaaS) (e.g., streaming services, content delivery services, video services, Internet content services, application services, conferencing services, etc.), infrastructure-as-a-service (IaaS), platform-as-a-service (PaaS) (e.g., web services, streaming services, content delivery services, content library services, conferencing services, video services, Internet content services, sharing and/or collaboration services, etc.), function-as-a-service (FaaS), and/or any other types of services such as desktop-as-a-service (DaaS), information technology management-as-a-service (ITaaS), managed software-as-a-service (MSaaS), mobile backend-as-a-service (MBaaS), etc.

The network architecture 150 described above illustrates a non-limiting example network architecture provided herein for explanation purposes. It should be noted that other network architectures can be implemented in other examples and are also contemplated herein. One of ordinary skill in the relevant art(s) will recognize in view of the disclosure that other network architectures can be used to implement one or more of the concepts, systems, techniques, devices, software, applications, methods, embodiments, elements, examples, and/or components disclosed herein.

An enterprise network associated with an entity can be implemented through the cloud computing environment 100 shown in FIG. 1A and the network architecture 150 shown in FIG. 1B. For example, data analysis system (or time-series data analyzer 110) for filtering time series data using multiple conditions can be implemented through the cloud computing environment and/or the network architecture 150.

Figure 2:
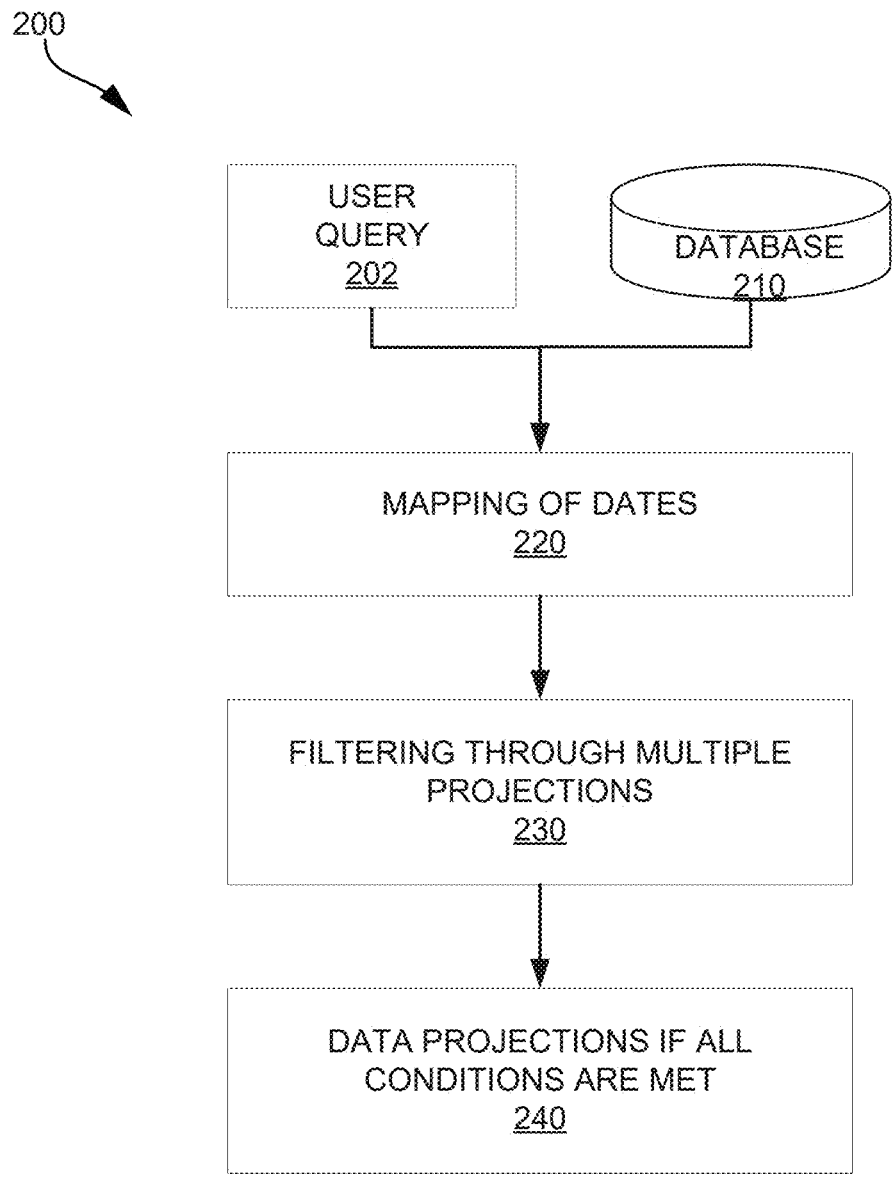
FIG. 2 is a diagram illustrating an example system process for dynamically filtering time series data using multiple conditions, according to some examples of the present disclosure.

FIG. 2 is a diagram illustrating an example system process 200 for dynamically filtering time series data using multiple conditions, according to some examples of the present disclosure. In this example, time-series data analyzer 110 (as illustrated in FIG. 1A) can analyze time-series data stored in database 210 using multiple conditions referenced in user query 202. Specifically, based on user query 202, time-series data analyzer 110 may query database 210, which is configured to store time-series data comprising a sequence of data points that are associated with successive points in time.

In some examples, user query 202 may include a data request for data captured in a time range (e.g., time-series data). For example, user query 202 may request data associated with a time range, which comprises a plurality of data points indexed in time order (e.g., daily, weekly, monthly, annually, etc.). In some cases, a client device (e.g., client device(s) 116A-116N) may provide a query or data request, which includes an analytics query for time-series data inquiring about an analysis of data points collected or recorded at specific time intervals.

The user query 202 may include one or more conditions associated with a time period or date range. For example, a user may specify a time range or a set of dates/data points such that a time series data query is to be done for the given time range or set of dates/data points (e.g., projecting number of incidents for given time range A-B, projecting average sales income for given time range A-B).

Further, user query 202 may include one or more conditions including relative date(s) such as next week, last week, last year, last quarter, etc. For example, user query 202 may request data for a number of incidents for given time range A-B where opened ON today AND duedate ON next week, an average sales income for given time range A-B where created ON last year AND Closed ON LastQuarter AND Type In Upsell Renewal, incidents resolved today AND created last week, and so on.

The time-series data analyzer 110 may map a set of dates (step 220) to project data requested in user query 202. As previously described, database 210 stores time-series data captured or recorded over time, which includes data points or values for various metrics (e.g., performance measurements from a computer system, incident resolution and closure, etc.). The time-series data analyzer 110 may generate a field that includes the time range (or time period) given in user query 202. For example, time-series data analyzer 110 may keep the field as a set of dates and transform the field so that the database does not have to expand to row-per-day format, and join the calendar mappings.

In some examples, time-series data analyzer 110 can filter each row through multiple conditions (step 230). For example, time-series data analyzer 110 can apply a set of transformations (e.g., projection operations) on each row of the single field through. As follows, for every record, time-series data analyzer 110 may filter out all conditions and generate one final output.

The time-series data analyzer 110 can generate projections if all conditions are met (step 240). For example, time-series data analyzer 110 can pass in a series of operations and run it over the data linearly, and determine whether all conditions match. The time-series data analyzer 110 may return the ones as output only if all conditions are satisfied.

Figure 3:
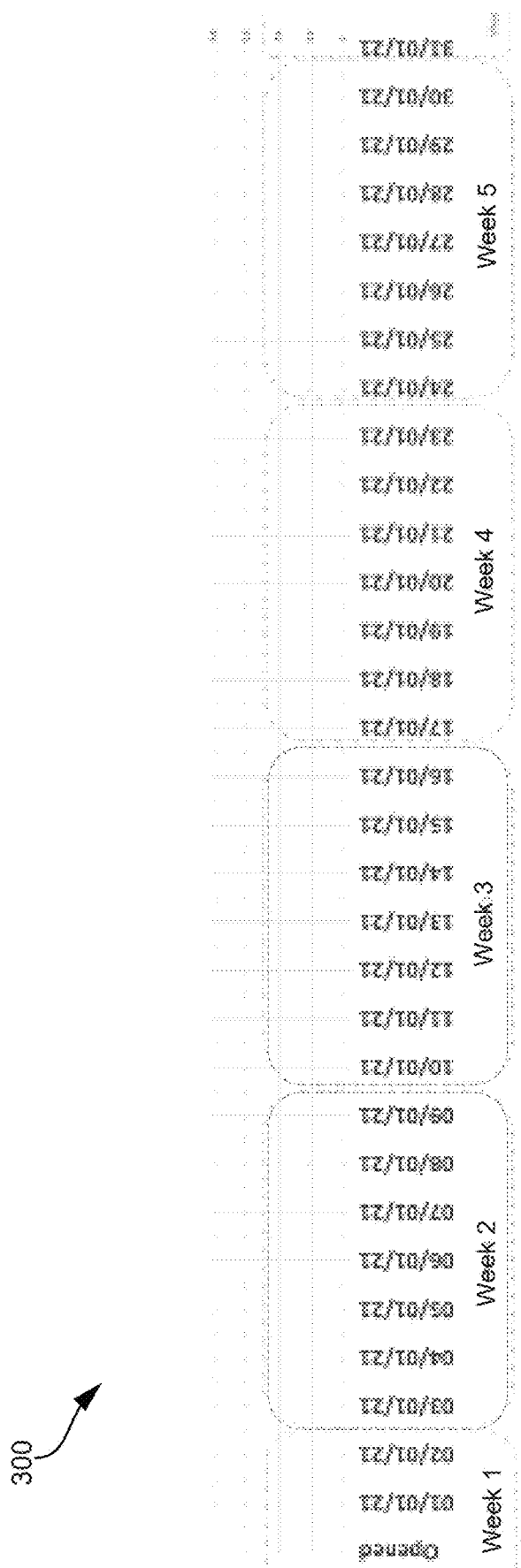
FIG. 3 illustrates an example diagram illustrating a relative date use case, according to some examples of the present disclosure.

FIG. 3 illustrates an example diagram 300 illustrating a relative date use case, according to some examples of the present disclosure. As previously described, a user may run an analytical query based on relative dates. For example, a user query may request data for a number of incidents, for duration 01/01/2021 to 14/01/2021, that were opened today AND due next week. However, the relative date condition can result in a problem due to multiple possible interpretations of the relative term. For example, the date "next week" can be interpreted in two different ways. First, if today is 01/01/2021, next week would be Week 2 (01/01/2021-09/01/2021). If today is 01/01/2021, next week would be Week 3 (10/01/2021-16/01/2021) as shown in FIG. 3.

The time-series data analyzer 110 may apply multiple projections to a time-series dataset in a single SQL query instead of generating all possible groupings to filter. For example, time-series data analyzer 110 may filter each day in a date range using a sequence of projection operators, for example, by creating a function called "project_filter_timestamp_array" as shown below.

```
range_start TIMESTAMPTZ,
range_end TIMESTAMPTZ,
projections_from_start TIMESTAMPTZ, -- Must be constant
projections_project_to TIMESTAMPTZ[ ][ ], -- Must be constant
projections_operators TEXT[ ], -- Must be constant
projections_values VARIADIC TIMESTAMPTZ[ ]
```

Further, time-series data analyzer 110 may apply the sequence of projection operators to the set of dates. For example, time-series data analyzer 110 may generate "opened_at, due_date, due_date" dates as an array as shown below:

{'2001-01-01', '2001-01-02', '2001-01-03', '2001-01-04', '2001-01-05', '2001-01-06', '2001-01-07', '2001-01-08', '2001-01-09', '2001-01-10', '2001-01-11', '2001-01-12', '2001-01-13', '2001-01-14' },

{'2001-01-03', '2001-01-03', '2001-01-10', '2001-01-10', '2001-01-10', '2001-01-10', '2001-01-10', '2001-01-10', '2001-01-10', '2001-01-17', '2001-01-17', '2001-01-17', '2001-01-17', '2001-01-17' },

{'2001-01-09', '2001-01-09', '2001-01-17', '2001-01-17', '2001-01-17', '2001-01-17', '2001-01-17', '2001-01-17', '2001-01-17', '2001-01-23', '2001-01-23', '2001-01-23', '2001-01-23', '2001-01-23' }

The time-series data analyzer 110 mark, as count, the record that matches all conditions and project only count(s) as output. As shown, multiple projections can be passed once, without a need to project all columns to be filtered first and filter using JOINs, thereby resulting in improved efficiency of data projection.

Figure 4:
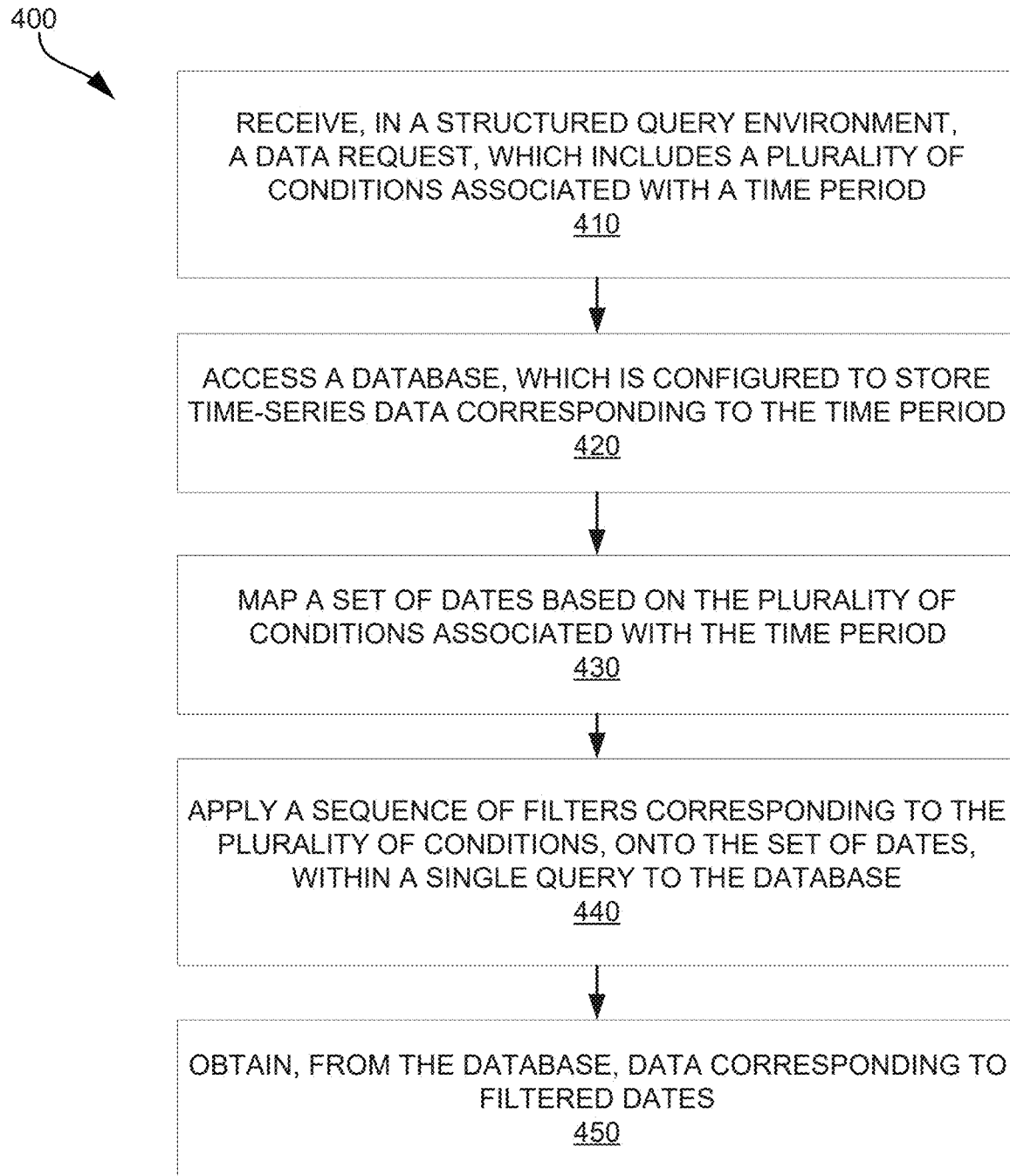
FIG. 4 illustrates a flowchart of an example method of dynamically filtering and projecting multiple conditions over relative time ranges, according to some examples of the present disclosure.

FIG. 4 illustrates a flowchart of an example method 400 of dynamically filtering and projecting multiple conditions over relative time ranges, according to some examples of the present disclosure. Method 400 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 4, as will be understood by a person of ordinary skill in the art.

At step 410, method 400 includes receiving a data request in a structure query environment. The data request can include a plurality of conditions associated with a time period. For example, time-series data analyzer 110 can receive a data request (e.g., user query 202) in a structured query environment such as a programming language environment that uses SQL. The data request can include a plurality of conditions associated with a date range. In some examples, a user (not shown) can use a client device (e.g., client device(s) 116A-116N) to provide user query 202, which may include a request for data under a plurality of conditions associated with a specific date range.

In some examples, the condition can be associated with relative date(s) such as next week, last week, last year, last quarter, etc., which may result in multiple interceptions during a given time range. As illustrated with respect to FIG. 3, the condition "duedate ON next week" for the duration 01/01/2021 to 14/01/2021 can be construed as a due date on either Week 2 (03/01/2021-09/01/2021) or Week 3 (10/01/2021-16/01/2021).

In some cases, the time period can be non-continuous, for example, based on a user query. To illustrate one example, a user can define a working week as any day(s) within a week such as non-continuous days including Sunday, Tuesday, Wednesday, Thursday, and Friday. The time-series data analyzer 110 may parse the user-defined dates to map into dates (Jan. 9, 2001; Jan. 11, 2001; Jan. 12, 2001; Jan. 13, 2001; Jan. 14, 2001) and use these dates to generate the analytics with the proposed solution of the present disclosure.

At step 420, method 400 includes accessing a database, which is configured to store time-series data corresponding to the time period. For example, time-series data analyzer 110 may access database 210, which is configured to store time-series data corresponding to the time period. The time-series data can be stored in database 210 in a table format in a relational database (e.g., SQL database), which would consist of timestamps paired with corresponding measurements, metrics, or events.

At step 430, method 400 includes mapping a set of dates based on the plurality of conditions associated with the time period. For example, time-series data analyzer 110 may map input dates to target dates by treating the date range specified in user query 202 as a set of dates.

In some examples, mapping the set of dates can include generating a first array of dates based on a first condition of the plurality of conditions and generating a second array of dates based on a second condition of the plurality of conditions. For example, time-series data analyzer 110 may generate a set of dates as an array(s) corresponding to a condition specified in user query 202. The mapping of dates as an array into a field can provide technical advantages. Specifically, this can allow applying a set of transformations onto a single field, instead of combining or applying JOIN for various relative translations, and therefore, it can sidestep the inefficiencies of projecting every possible column and improve the efficiency of data projections even when the data volume is high.

At step 440, method 400 includes applying a sequence of filters corresponding to the plurality of conditions, onto the set of dates, within a single query to the database. For example, time-series data analyzer 110 can filter each row through a set of projection operations. As follows, filtering each day within the time period using the sequence of filters corresponding to the plurality of conditions such that time-series data analyzer 110 can filter out all conditions for every record in one pass.

Applying multiple filter projections to each date in the date range can provide numerous technical advantages. Specifically, time-series data can be efficiently processed by utilizing multiple projections and filters to be passed once as a single query to a database. Further, since the disclosed technology project data only if all conditions are met, multiple conditions such as relative date conditions can be applied across varying timeframes efficiently and promptly (e.g., in less than 30 seconds) compared to projecting all possible data rows that would take more than 10 minutes.

At step 450, method 400 includes obtaining, from the database, data corresponding to filtered dates. For example, time-series data analyzer 110 access database 210 and obtain data corresponding to the filtered dates (e.g., data that match all of conditions). In some implementations, method 400 can include generating a response to the data request based on the data obtained from the database. For example, time-series data analyzer 110 may generate a response to user query 202 based on the projected data obtained from database 210.

Figure 5:
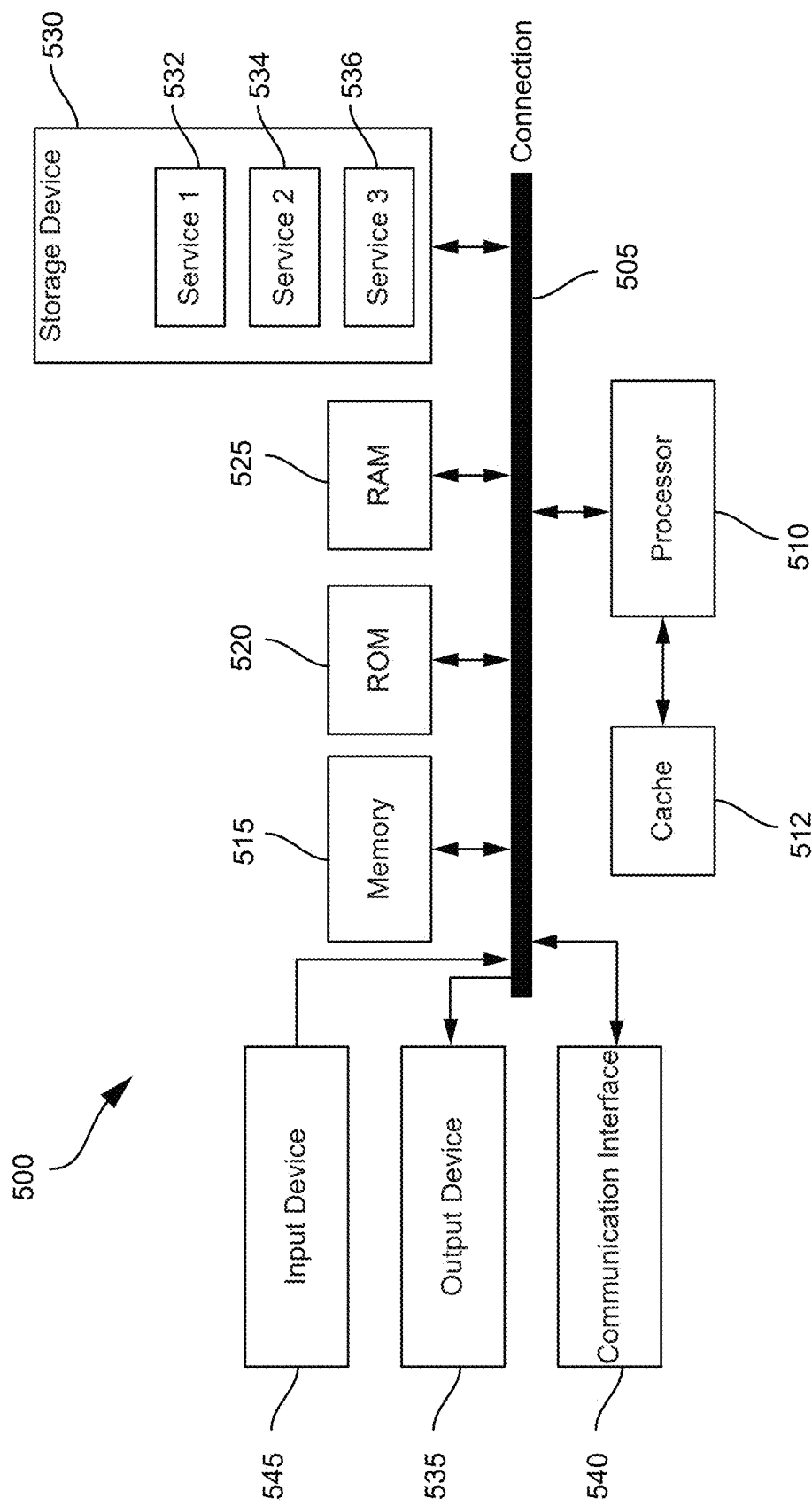
FIG. 5 illustrates an example processor-based system with which some aspects of the subject technology can be implemented, according to some examples of the present disclosure.

FIG. 5 illustrates an example processor-based system with which some aspects of the subject technology can be implemented. For example, processor-based system 500 can be any computing device making up the data analysis system, time-series data analyzer 110, any of the client devices 116, or any component thereof in which the components of the system are in communication with each other using connection 505. Connection 505 can be a physical connection via a bus, or a direct connection into processor 510, such as in a chipset architecture. Connection 505 can also be a virtual connection, networked connection, or logical connection.

In some examples, computing system 500 is a distributed system in which the functions described in this disclosure can be distributed within a datacenter, multiple data centers, a peer network, etc. In some implementations, one or more of the described system components represents many such components each performing some or all of the function for which the component is described. In some embodiments, the components can be physical or virtual devices.

Example system 500 includes at least one processing unit (Central Processing Unit (CPU) or processor) 510 and connection 505 that couples various system components including system memory 515, such as Read-Only Memory (ROM) 520 and Random-Access Memory (RAM) 525 to processor 510. Computing system 500 can include a cache of high-speed memory 512 connected directly with, in close proximity to, or integrated as part of processor 510.

Processor 510 can include any general-purpose processor and a hardware service or software service, such as services 532, 534, and 536 stored in storage device 530, configured to control processor 510 as well as a special-purpose processor where software instructions are incorporated into the actual processor design. Processor 510 may essentially be a completely self-contained computing system, containing multiple cores or processors, a bus, memory controller, cache, etc. A multi-core processor may be symmetric or asymmetric.

To enable user interaction, computing system 500 includes an input device 545, which can represent any number of input mechanisms, such as a microphone for speech, a touch-sensitive screen for gesture or graphical input, keyboard, mouse, motion input, speech, etc. Computing system 500 can also include output device 535, which can be one or more of a number of output mechanisms known to those of skill in the art. In some instances, multimodal systems can enable a user to provide multiple types of input/output to communicate with computing system 500. Computing system 500 can include communication interface 540, which can generally govern and manage the user input and system output. The communication interface may perform or facilitate receipt and/or transmission wired or wireless communications via wired and/or wireless transceivers, including those making use of an audio jack/plug, a microphone jack/plug, a Universal Serial Bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a Radio-Frequency Identification (RFID) wireless signal transfer, Near-Field Communications (NFC) wireless signal transfer, Dedicated Short Range Communication (DSRC) wireless signal transfer, 502.11 Wi-Fi® wireless signal transfer, Wireless Local Area Network (WLAN) signal transfer, Visible Light Communication (VLC) signal transfer, Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer signal transfer, ultraviolet light signal transfer, wireless signal transfer along the electromagnetic spectrum, or some combination thereof.

Communication interface 540 may also include one or more Global Navigation Satellite System (GNSS) receivers or transceivers that are used to determine a location of the computing system 500 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 530 can be a non-volatile and/or non-transitory and/or computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a Compact Disc (CD) Read Only Memory (CD-ROM) optical disc, a rewritable CD optical disc, a Digital Video Disk (DVD) optical disc, a Blu-ray Disc (BD) optical disc, a holographic optical disk, another optical medium, a Secure Digital (SD) card, a micro SD (microSD) card, a Memory Stick® card, a smartcard chip, a EMV chip, a Subscriber Identity Module (SIM) card, a mini/micro/nano/pico SIM card, another Integrated Circuit (IC) chip/card, Random-Access Memory (RAM), Atatic RAM (SRAM), Dynamic RAM (DRAM), Read-Only Memory (ROM), Programmable ROM (PROM), Erasable PROM (EPROM), Electrically Erasable PROM (EEPROM), flash EPROM (FLASHEPROM), cache memory (L1/L2/L3/L4/L5/L#), Resistive RAM (RRAM/ReRAM), Phase Change Memory (PCM), Spin Transfer Torque RAM (STT-RAM), another memory chip or cartridge, and/or a combination thereof.

Storage device 530 can include software services, servers, services, etc., that when the code that defines such software is executed by the processor 510, it causes the system 500 to perform a function. In some embodiments, a hardware service that performs a particular function can include the software component stored in a computer-readable medium in connection with the necessary hardware components, such as processor 510, connection 505, output device 535, etc., to carry out the function.

Embodiments within the scope of the present disclosure may also include tangible and/or non-transitory computer-readable storage media or devices for carrying or having computer-executable instructions or data structures stored thereon. Such tangible computer-readable storage devices can be any available device that can be accessed by a general purpose or special purpose computer, including the functional design of any special purpose processor as described above. By way of example, and not limitation, such tangible computer-readable devices can include RAM, ROM, EEPROM, CD-ROM or other optical disk storage, magnetic disk storage or other magnetic storage devices, or any other device which can be used to carry or store desired program code in the form of computer-executable instructions, data structures, or processor chip design. When information or instructions are provided via a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable storage devices.

Computer-executable instructions include, for example, instructions and data which cause a general-purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform tasks or implement abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Other embodiments of the disclosure may be practiced in network computing environments with many types of computer system configurations, including personal computers, hand-held devices, multi-processor systems, microprocessor-based or programmable consumer electronics, network Personal Computers (PCs), minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various embodiments described above are provided by way of illustration only and should not be construed to limit the scope of the disclosure. For example, the principles herein apply equally to optimization as well as general improvements. Various modifications and changes may be made to the principles described herein without following the example embodiments and applications illustrated and described herein, and without departing from the spirit and scope of the disclosure.

Claim language or other language in the disclosure reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

Illustrative examples of the present disclosure include:

Aspect 1. A computer-implemented method comprising: receiving, in a structured query environment, a data request, the data request including a plurality of conditions associated with a time period; accessing a database, which is configured to store time-series data corresponding to the time period; mapping a set of dates based on the plurality of conditions associated with the time period; applying a sequence of filters corresponding to the plurality of conditions, onto the set of dates, within a single query to the database; and obtaining, from the database, data corresponding to filtered dates.

Aspect 2. The computer-implemented method of Aspect 1, wherein at least one of the plurality of conditions is associated with relative dates.

Aspect 3. The computer-implemented method of any of Aspects 1 to 2, wherein mapping the set of dates based on the plurality of conditions associated with the time period comprises: generating a first array of dates based on a first condition of the plurality of conditions; and generating a second array of dates based on a second condition of the plurality of conditions.

Aspect 4. The computer-implemented method of any of Aspects 1 to 3, wherein the sequence of filters is a sequence of projection operators corresponding to the plurality of conditions.

Aspect 5. The computer-implemented method of any of Aspects 1 to 4, wherein applying the sequence of filters corresponding to the plurality of conditions comprises: filtering each day within the time period using the sequence of filters corresponding to the plurality of conditions.

Aspect 6. The computer-implemented method of any of Aspects 1 to 5, wherein the time period is non-continuous.

Aspect 7. The computer-implemented method of any of Aspects 1 to 6, further comprising: generating a response to the data request based on the data obtained from the database.

Aspect 8. A system comprising: one or more processors; and at least one computer-readable storage medium having stored therein instructions which, when executed by the one or more processors, cause the one or more processors to: receive, in a structured query environment, a data request, the data request including a plurality of conditions associated with a time period; access a database, which is configured to store time-series data corresponding to the time period; map a set of dates based on the plurality of conditions associated with the time period; apply a sequence of filters corresponding to the plurality of conditions, onto the set of dates, within a single query to the database; and obtain, from the database, data corresponding to filtered dates.

Aspect 9. The system of Aspect 8, wherein at least one of the plurality of conditions is associated with relative dates.

Aspect 10. The system of any of Aspects 8 to 9, wherein mapping the set of dates based on the plurality of conditions associated with the time period comprises: generating a first array of dates based on a first condition of the plurality of conditions; and generating a second array of dates based on a second condition of the plurality of conditions.

Aspect 11. The system of any of Aspects 8 to 10, wherein the sequence of filters is a sequence of projection operators corresponding to the plurality of conditions.

Aspect 12. The system of any of Aspects 8 to 11, wherein applying the sequence of filters corresponding to the plurality of conditions comprises: filtering each day within the time period using the sequence of filters corresponding to the plurality of conditions.

Aspect 13. The system of any of Aspects 8 to 12, wherein the time period is non-continuous.

Aspect 14. The system of any of Aspects 8 to 13, wherein the instructions further cause the one or more processors to: generating a response to the data request based on the data obtained from the database.

Aspect 15. A non-transitory computer-readable medium having stored thereon instructions which, when executed by one or more processors, cause the one or more processors to: receive, in a structured query environment, a data request, the data request including a plurality of conditions associated with a time period; access a database, which is configured to store time-series data corresponding to the time period; map a set of dates based on the plurality of conditions associated with the time period; apply a sequence of filters corresponding to the plurality of conditions, onto the set of dates, within a single query to the database; and obtain, from the database, data corresponding to filtered dates.

Aspect 16. The non-transitory computer-readable medium of Aspect 15, wherein at least one of the plurality of conditions is associated with relative dates.

Aspect 17. The non-transitory computer-readable medium of any of Aspects 15 to 16, wherein mapping the set of dates based on the plurality of conditions associated with the time period comprises: generating a first array of dates based on a first condition of the plurality of conditions; and generating a second array of dates based on a second condition of the plurality of conditions.

Aspect 18. The non-transitory computer-readable medium of any of Aspects 15 to 17, wherein the sequence of filters is a sequence of projection operators corresponding to the plurality of conditions.

Aspect 19. The non-transitory computer-readable medium of any of Aspects 15 to 18, wherein applying the sequence of filters corresponding to the plurality of conditions comprises: filtering each day within the time period using the sequence of filters corresponding to the plurality of conditions.

Aspect 20. The non-transitory computer-readable medium of any of Aspects 15 to 19, wherein the time period is non-continuous.

What is claimed is:

1. A computer-implemented method comprising:
receiving, in a structured query environment, a data request, the data request including a plurality of conditions associated with a time period;
accessing a database, which is configured to store time-series data corresponding to the time period;
mapping a set of dates based on the plurality of conditions associated with the time period;
applying a sequence of filters corresponding to the plurality of conditions, onto the set of dates, within a single query to the database; and
obtaining, from the database, data corresponding to filtered dates.

2. The computer-implemented method of claim 1, wherein at least one of the plurality of conditions is associated with relative dates.

3. The computer-implemented method of claim 1, wherein mapping the set of dates based on the plurality of conditions associated with the time period comprises:
generating a first array of dates based on a first condition of the plurality of conditions; and
generating a second array of dates based on a second condition of the plurality of conditions.

4. The computer-implemented method of claim 1, wherein the sequence of filters is a sequence of projection operators corresponding to the plurality of conditions.

5. The computer-implemented method of claim 1, wherein applying the sequence of filters corresponding to the plurality of conditions comprises:
filtering each day within the time period using the sequence of filters corresponding to the plurality of conditions.

6. The computer-implemented method of claim 1, wherein the time period is non-continuous.

7. The computer-implemented method of claim 1, further comprising:
generating a response to the data request based on the data obtained from the database.

8. A system comprising:
one or more processors; and
at least one computer-readable storage medium having stored therein instructions which, when executed by the one or more processors, cause the one or more processors to:
receive, in a structured query environment, a data request, the data request including a plurality of conditions associated with a time period;
access a database, which is configured to store time-series data corresponding to the time period;
map a set of dates based on the plurality of conditions associated with the time period;
apply a sequence of filters corresponding to the plurality of conditions, onto the set of dates, within a single query to the database; and
obtain, from the database, data corresponding to filtered dates.

9. The system of claim 8, wherein at least one of the plurality of conditions is associated with relative dates.

10. The system of claim 8, wherein mapping the set of dates based on the plurality of conditions associated with the time period comprises:
generating a first array of dates based on a first condition of the plurality of conditions; and
generating a second array of dates based on a second condition of the plurality of conditions.

11. The system of claim 8, wherein the sequence of filters is a sequence of projection operators corresponding to the plurality of conditions.

12. The system of claim 8, wherein applying the sequence of filters corresponding to the plurality of conditions comprises:
filtering each day within the time period using the sequence of filters corresponding to the plurality of conditions.

13. The system of claim 8, wherein the time period is non-continuous.

14. The system of claim 8, wherein the instructions further cause the one or more processors to:
generating a response to the data request based on the data obtained from the database.

15. A non-transitory computer-readable medium having stored thereon instructions which, when executed by one or more processors, cause the one or more processors to:
receive, in a structured query environment, a data request, the data request including a plurality of conditions associated with a time period;
access a database, which is configured to store time-series data corresponding to the time period;
map a set of dates based on the plurality of conditions associated with the time period;
apply a sequence of filters corresponding to the plurality of conditions, onto the set of dates, within a single query to the database; and
obtain, from the database, data corresponding to filtered dates.

16. The non-transitory computer-readable medium of claim 15, wherein at least one of the plurality of conditions is associated with relative dates.

17. The non-transitory computer-readable medium of claim 15, wherein mapping the set of dates based on the plurality of conditions associated with the time period comprises:
generating a first array of dates based on a first condition of the plurality of conditions; and
generating a second array of dates based on a second condition of the plurality of conditions.

18. The non-transitory computer-readable medium of claim 15, wherein the sequence of filters is a sequence of projection operators corresponding to the plurality of conditions.

19. The non-transitory computer-readable medium of claim 15, wherein applying the sequence of filters corresponding to the plurality of conditions comprises:
filtering each day within the time period using the sequence of filters corresponding to the plurality of conditions.

20. The non-transitory computer-readable medium of claim 15, wherein the time period is non-continuous.

* * * * *